United States Patent
Ikeda et al.

(10) Patent No.: US 8,084,985 B2
(45) Date of Patent: Dec. 27, 2011

(54) INVERTER CONTROL METHOD

(75) Inventors: Motonobu Ikeda, Osaka (JP); Satoshi Yagi, Osaka (JP); Michiya Takezoe, Osaka (JP); Hiroyuki Kondou, Osaka (JP); Hirotaka Doi, Osaka (JP); Hirohito Maeda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 492 days.

(21) Appl. No.: 12/303,055

(22) PCT Filed: Jun. 20, 2007

(86) PCT No.: PCT/JP2007/062429
§ 371 (c)(1),
(2), (4) Date: Dec. 1, 2008

(87) PCT Pub. No.: WO2007/148726
PCT Pub. Date: Dec. 27, 2007

(65) Prior Publication Data
US 2009/0243525 A1    Oct. 1, 2009

(30) Foreign Application Priority Data
Jun. 23, 2006   (JP) .................................. 2006-173832

(51) Int. Cl.
H02P 27/06    (2006.01)
H02M 7/48    (2007.01)

(52) U.S. Cl. ................... 318/801; 318/798; 318/400.01; 318/400.22

(58) Field of Classification Search .................. 318/801, 318/798, 799, 800, 802, 803, 700, 400.01, 318/400.07, 400.22, 400.26
See application file for complete search history.

(56) References Cited

U.S. PATENT DOCUMENTS

| | | | |
|---|---|---|---|
| 6,686,715 B2* | 2/2004 | Fan | 318/461 |
| 7,781,999 B2* | 8/2010 | Amano | 318/400.3 |

FOREIGN PATENT DOCUMENTS

| | | |
|---|---|---|
| JP | 6-70441 U | 9/1994 |
| JP | 7-115791 A | 5/1995 |
| JP | 2000-217247 A | 8/2000 |
| JP | 2002-138966 A | 5/2002 |
| JP | 2003-111479 A | 4/2003 |
| JP | 2005-245075 A | 9/2005 |

OTHER PUBLICATIONS

Korean Office Action 10-2008-7031071 dated Aug. 31, 2010.

* cited by examiner

*Primary Examiner* — Eduardo Colon Santana
(74) *Attorney, Agent, or Firm* — Birch, Stewart, Kolasch & Birch, LLP

(57) ABSTRACT

Two current threshold values are adopted, which are larger than the upper limit of current of an operating region. When a rotating speed is smaller than a speed threshold value, the current threshold value is adopted as a criterion to judge whether an input current to an inverter is abnormal, and when the rotating speed Rot is larger than that, the other current threshold value is adopted as the criterion.

1 Claim, 3 Drawing Sheets

F I G . 1
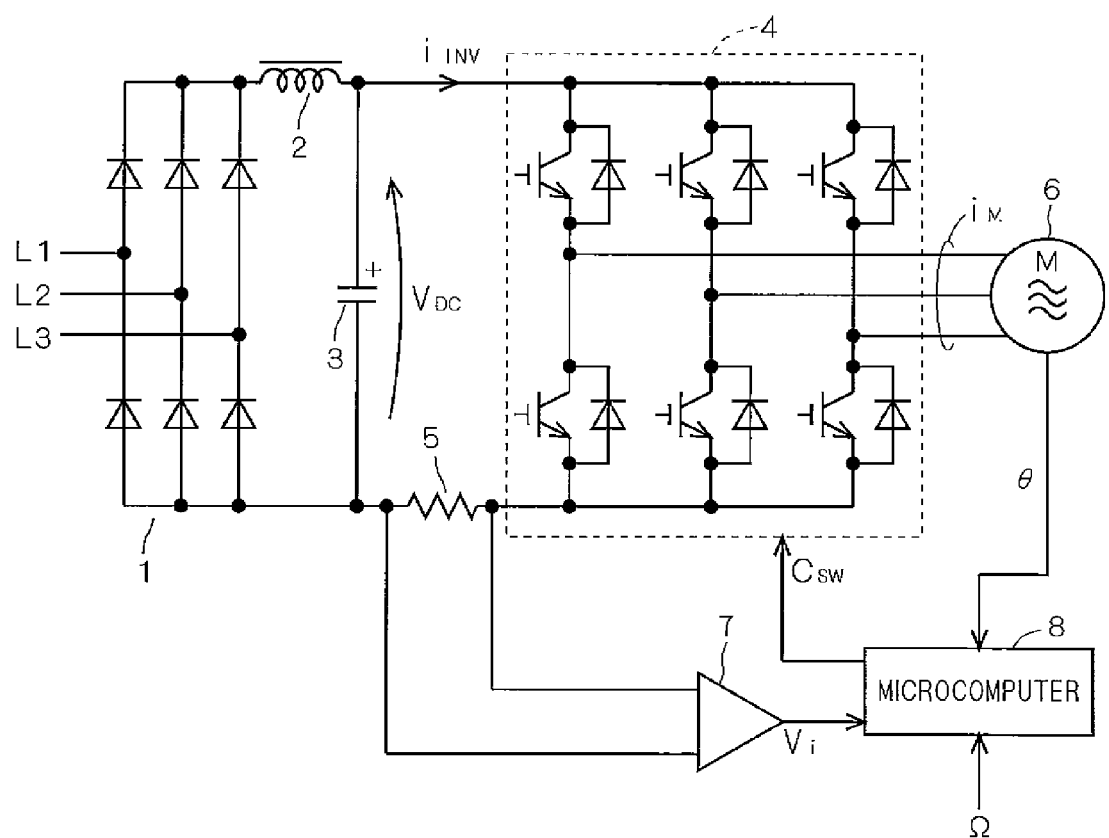

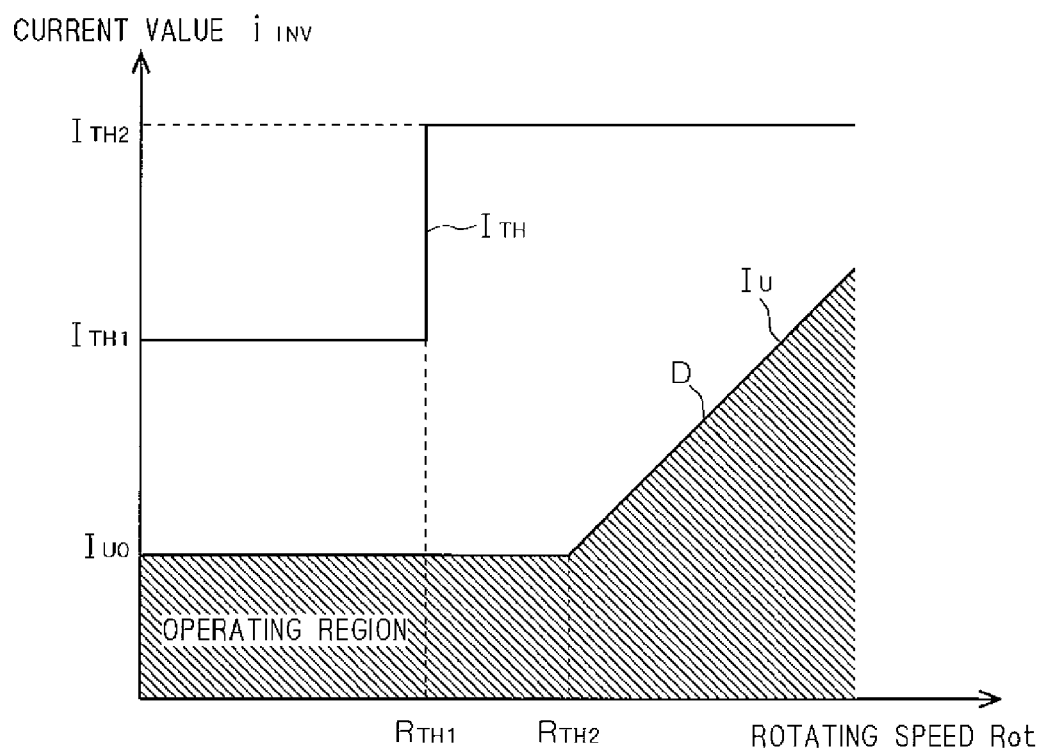
F I G . 2

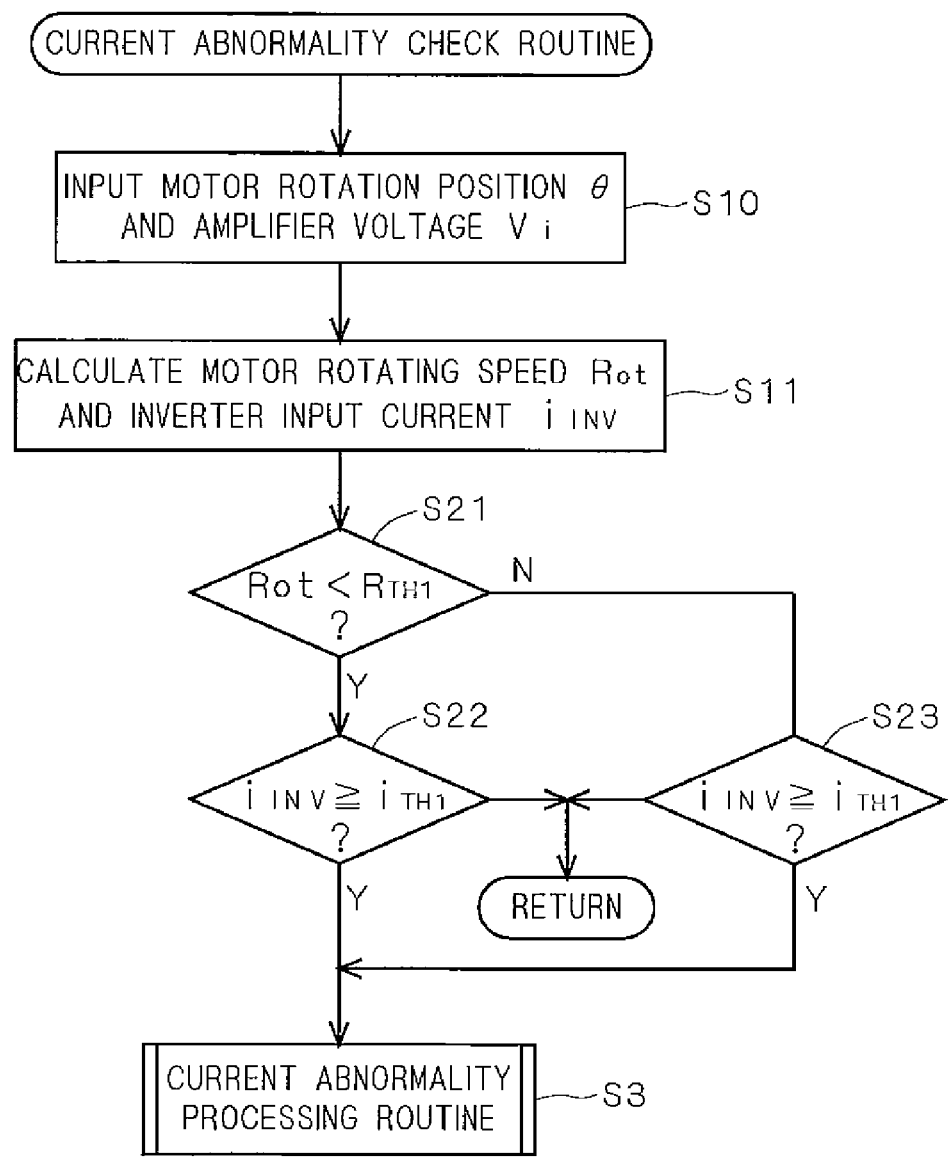

INVERTER CONTROL METHOD

TECHNICAL FIELD

The present invention relates to a method for controlling an inverter, and particularly to a technique of detecting abnormalities of the current flowing in an inverter.

BACKGROUND ART

When an inverter drives a rotating machine like a motor by using an inverter; a situation may be encountered such that the number of rotations of the rotating machine is considerably lowered by physical problems, for example, the rotating machine may be overloaded, or adhesion of lubricating oil in the rotating machine itself. A motor lock is known as a notable example of such conditions.

Patent Documents 1 and 2 are cited herein as disclosing techniques for dealing with the motor lock. In the technique described in Patent Document 1, a constant-voltage supply to the motor is stopped for a given period when the current flowing in the motor exceeds a reference value. In the technique described in Patent Document 2, a lock state is detected when a same pole of the motor is continuously detected for a predetermined time period.

Also, Patent Document 3 is cited as a technique about drooping control in which the rotating speed is controlled in such a manner that the current command does not exceed an upper-limit current value.

Patent Document 1: Japanese Utility Model Application Laid-Open No. 6-70441 (1994)
Patent Document 2: Japanese Patent Application Laid-Open No. 2005-245075
Patent Document 3: Japanese Patent Application Laid-Open No. 2002-138966

An inverter for controlling a motor uses switching elements, such as IGBTs. Allowable heat tolerances of such switching elements are becoming smaller because of the trends toward miniaturization and cost reduction.

When the conventional techniques cited above are used under such conditions, there are problems as mentioned below for switching elements, and further in the protection of the inverter.

In making a judgment as to whether the current flowing in the motor exceeds a simple reference value, carefully protecting the switching elements involves lowering the reference value. When the rotating speed is extremely low, the reference value has to be lowered because current flows for an increased time period in the same switching elements and the same motor winding. However, for high-speed rotation, the motor cannot run unless the reference value is exceeded, resulting in the reference value interfering with the operating region of the motor.

Also, when the condition is judged as being locked when the same pole of the motor has been continuously detected for a predetermined time period, the same judgment is made at the start of operation, causing a malfunction.

The present invention has been made by considering the problems above, and an object of the present invention is to make it possible, without interfering with the operating region of a motor, to more strictly judge inverter operation (excess input current) that deviates from the operating region in a low rotating speed area, so as to carefully protect the inverter.

DISCLOSURE OF THE INVENTION

Means for Solving the Problems

A first aspect of the inverter control method of the present invention relates to a method for controlling an inverter (4) that receives a DC voltage ($V_{DC}$) and supplies a polyphase current ($i_M$) to a polyphase motor (6). The method comprises: (a) a step (S10, S11) of detecting a rotating speed (Rot) of said polyphase motor and a current value of an input current ($i_{INV}$) to said inverter; (b) a step (S21, S22) of, when said rotating speed is less than a first speed threshold value ($R_{TH1}$), judging that an operation of said inverter is abnormal when said current value is equal to or more than a first current threshold value ($I_{TH1}$); and (c) a step (S21, S23) of, when said rotating speed is equal to or more than said first speed threshold value, judging that an operation of said inverter is abnormal when said current value is equal to or more than a second current threshold value ($I_{TH2}$) that is larger than said first current threshold value.

According to a second aspect of the inverter control method of the present invention, in the method of the first aspect, an operating region (D) of said polyphase motor is represented with an upper limit ($I_U$) of said current value with respect to said rotating speed, and when said rotating speed (Rot) is less than a second speed threshold value ($R_{TH2}$), said upper limit takes a constant value ($I_{U0}$), and when said rotating speed is equal to or more than said second speed threshold value, said upper limit increases as said rotating speed increases, and said first speed threshold value ($R_{TH1}$) is less than said second speed threshold value, and said first current threshold value ($I_{TH1}$) is larger than said constant value.

Effects of the Invention

In the operating region of a polyphase motor, the upper limit allowable for the current flowing in the polyphase motor and inverter decreases as the rotating speed decreases. Thus, according to the first aspect of the inverter control method of the present invention, it is possible, without interfering with the operating region, to more strictly judge inverter operation (excess input current) that deviates from the operating region in a low rotating speed area, so as to carefully protect the inverter.

When the rotating speed is low, large input current is not needed, and so the upper limit of the current value of the operating region can be set at a small fixed value. Accordingly, as shown by the second aspect of the inverter control method of the present invention, the first current threshold value can be set small at the first speed threshold value that is smaller than the second speed threshold value at which the upper limit of the current value of the operating region starts gradually increasing, making it possible to carefully protect the inverter when the rotating speed is lacking, e.g. when a motor lock is occurring.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1. is a circuit diagram illustrating a circuit to which the inverter control method of the present invention is applicable.

FIG. 2. is a graph explaining the inverter control method of this preferred embodiment.

FIG. 3. is a flowchart illustrating the inverter control method of the preferred embodiment of the present invention.

BEST MODE FOR CARRYING OUT THE INVENTION

FIG. 1 is a circuit diagram illustrating a circuit to which the inverter control method of the present invention is applicable. Three-phase AC voltages are applied to power-supply lines L1, L2 and L3. The three-phase AC voltages are rectified by a diode bridge 1, and charge a capacitor 3 through a choke coil 2. The capacitor 3 holds a DC voltage $V_{DC}$.

An inverter 4 receives the DC voltage $V_{DC}$ and supplies three-phase currents $i_M$ to a three-phase motor 6. The rotation position θ of the three-phase motor 6 is detected by, e.g. a position sensor (not shown), which is inputted to a microcomputer 8 as an electric signal.

Current $i_{INV}$ inputted to the inverter 4 is obtained from a voltage drop at a resistor 5 interposed in one of a pair of buses that connect the inverter 4 and the capacitor 3. Specifically, the resistor 5 is interposed in the negative-side bus that connects the capacitor 3 and the inverter 4, and a voltage generated across both ends thereof is outputted as a voltage Vi by an amplifier 7 and inputted to the microcomputer 8.

The microcomputer 8 obtains the rotating speed Rot of the motor 6 from the time variation of the rotation position θ, and also obtains the input current $i_{INV}$ to the inverter from the voltage Vi. Then, a switching signal $C_{SW}$ is generated on the basis of the rotating speed Rot, the input current $i_{INV}$, and a rotation command Ω. The switching of the switching elements of the inverter 4 is performed on the basis of the switching signal $C_{SW}$.

FIG. 2 is a graph explaining the inverter control method of this preferred embodiment, where the horizontal axis shows the rotating speed Rot of the motor 6 and the vertical axis shows the input current $i_{INV}$ to the inverter 4.

The operating region D is represented by the upper limit $I_U$ of the input current $i_{INV}$ with respect to the rotating speed Rot. That is, when the motor 6 is rotating at a rotating speed Rot, the input current $i_{INV}$ is normally not more than the upper limit $I_U$. Drooping control as illustrated in Patent Document 3 is possible in the operating region D.

Normally, the input current $i_{INV}$ required for the operation of the motor 6 nonlinearly increases as the rotating speed Rot increases. The upper limit $I_U$ therefore approximates to this phenomenon; it takes a constant value $I_{U0}$ when the rotating speed Rot is less than a speed threshold value $R_{TH2}$, and it increases as the rotating speed Rot increases when the rotating speed Rot is higher than that.

Now, a current threshold $I_{TH}$ is set so that excess input current $i_{INV}$ is judged as an abnormality. The current threshold $I_{TH}$ takes a current threshold value $I_{TH1}$ when the rotating speed Rot is less than a speed threshold value $R_{TH1}$, and it takes a current threshold value $I_{TH2}$ when the rotating speed Rot is equal to or more than the speed threshold value $R_{TH1}$. The current threshold $I_{TH}$ is set to be larger than the upper limit $I_U$ such that it does not interfere with the operating region D.

FIG. 3 is a flowchart illustrating the inverter control method of a preferred embodiment of the present invention, which checks for abnormalities of the input current $i_{INV}$ to the inverter. This flowchart is executed by the microcomputer 8.

In Step S10, the rotation position θ of the motor 6 and the voltage Vi outputted from the amplifier 7 are inputted to the microcomputer 8. Then, in Step S11 the rotating speed Rot of the motor 6 and the input current $i_{INV}$ to the inverter are obtained by calculation based on them. Steps S10 and S11 are performed also in normal control of the operation of the motor 6, and there is no need to provide the steps separately for the current abnormality check routine.

Step S21 checks whether the rotating speed Rot is less than the speed threshold value $R_{TH1}$. Then, the process goes to Step S22 when the judgment is affirmative, and it goes to Step S23 when the judgment is negative. Step S22 checks whether the input current $i_{INV}$ is equal to or more than the threshold value $I_{TH1}$, or not. Then, the process goes to Step S3 when the judgment is affirmative, and it returns to a main routine (not shown) when the judgment is negative.

When the process moves to Step S3, it means that the input current $i_{INV}$ to the inverter 4 is excessive and its operation is abnormal, and so a current abnormality processing routine is executed in Step S3. For example, the current abnormality processing routine may stop the operation of the inverter 4 with the switching signal $C_{SW}$.

Step S23 checks whether the input current $i_{INV}$ is equal to or more than the threshold value $I_{TH2}$, or not. Then, the process goes to Step S3 when the judgment is affirmative, and it returns to the main routine (not shown) when the judgment is negative.

In the operating region D of the motor 6, the upper limit $I_U$ allowed for the current flowing in the motor 6 decreases as the rotating speed Rot decreases. Accordingly, the current threshold $I_{TH}$ is set at the smaller current threshold value $I_{TH1}$ when the rotating speed Rot is smaller, and it is set at the larger current threshold value $I_{TH2}$ when the rotating speed Rot is larger, making it possible, without interfering with the operating region D, to more strictly judge operation of the inverter 4 (excess input current $i_{INV}$) that deviates from the operating region D in an area where the rotating speed Rot is lower, thus making it possible to carefully protect the inverter 4. Strictly judging excess input current $i_{INV}$ is desirable also to avoid overheating of the motor.

It is desired that the speed threshold value $R_{TH1}$, which determines the current threshold value, be less than the speed threshold value $R_{TH2}$ that defines the operating region D, and that the current threshold value $I_{TH1}$ be larger than the constant value $I_{U0}$.

For example, the speed threshold values $R_{TH1}$ and $R_{TH2}$ are 100 rpm and 200 rpm, respectively, and the current threshold values $I_{TH1}$, $I_{TH2}$ and the constant value $I_{U0}$ are 2 amperes, 5 amperes, and 1 ampere, respectively.

When the rotating speed Rot is low, the input current $i_{INV}$ does not have to be large, and so the upper limit $I_U$ of the input current $i_{INV}$ of the operating region D can be set at the small fixed value $I_{U0}$. Thus, the current threshold value $I_{TH1}$, can be set small at the speed threshold value $R_{TH1}$ that is smaller than the speed threshold value $R_{TH2}$ at which the upper limit $I_U$ defining the operating region D starts gradually increasing with increasing rotating speed Rot. This makes it possible to carefully protect the inverter 4 when the rotating speed Rot is lacking, e.g. when a motor lock is occurring.

The description above has shown an example in which the current threshold values $I_{TH1}$ and $I_{TH2}$ take constant values, but the present invention is not limited to this example. For instance, while keeping the current threshold value $I_{TH2}$ larger than the current threshold value $I_{TH1}$, they can be not constant with respect to the rotating speed Rot. For example, the current threshold values $I_{TH1}$ and $I_{TH2}$ may increase linearly, or in a higher-order curve manner, with increasing rotating speed Rot.

While the invention has been described in detail, the foregoing description is in all aspects illustrative and not restrictive. It is understood that numerous other modifications and variations can be devised without departing from the scope of the invention.

The invention claimed is:

1. A method for controlling an inverter that receives a DC voltage and supplies a polyphase current to a polyphase motor, the method comprising:
    (a) a step of detecting a rotating speed of said polyphase motor and a current value of an input current to said inverter;
    (b) a step of, when said rotating speed is less than a first speed threshold value, judging that an operation of said inverter is abnormal when said current value is equal to or more than a first current threshold value; and
    (c) a step of, when said rotating speed is equal to or more than said first speed threshold value, judging that an operation of said inverter is abnormal when said current value is equal to or more than a second current threshold value that is larger than said first current threshold value,
    wherein an operating region of said polyphase motor is represented with an upper limit of said current value with respect to said rotating speed, and
    when said rotating speed is less than a second speed threshold value, said upper limit takes a constant value, and
    when said rotating speed is equal to or more than said second speed threshold value, said upper limit increases as said rotating speed increases, and
    said first speed threshold value is less than said second speed threshold value, and said first current threshold value is larger than said constant value.

* * * * *